United States Patent
Rem et al.

(10) Patent No.: US 7,714,182 B2
(45) Date of Patent: May 11, 2010

(54) METHOD FOR TREATING BOTTOM ASH

(75) Inventors: Peter Carlo Rem, Rijswijk (NL); Hans Van Craaikamp, Amsterdam (NL); Simon Peter Maria Berkhout, Schipluiden (NL); Wil Sierhuis, Amsterdam (NL); Laurens Anton Van Kooy, Voorburg (NL)

(73) Assignees: Technische Universiteit Delft, Delft (NL); Gemeente Amsterdam, Afval Energie Bedrijf, Amsterdam (NL)

( * ) Notice: Subject to any disclaimer, the term of this patent is extended or adjusted under 35 U.S.C. 154(b) by 91 days.

(21) Appl. No.: 12/018,545

(22) Filed: Jan. 23, 2008

(65) Prior Publication Data
US 2008/0236457 A1 Oct. 2, 2008

Related U.S. Application Data

(63) Continuation-in-part of application No. PCT/NL2006/050189, filed on Jul. 26, 2006.

(30) Foreign Application Priority Data
Jul. 27, 2005 (NL) .................................. 1029628

(51) Int. Cl.
C02F 1/00 (2006.01)
(52) U.S. Cl. ....................... 588/405; 588/407; 588/261; 588/412

(58) Field of Classification Search ................. 588/261, 588/412, 405, 407
See application file for complete search history.

(56) References Cited

U.S. PATENT DOCUMENTS 5,051,190 A * 9/1991 Schwyter ..................... 210/695
6,867,249 B2 * 3/2005 Lee ................................ 524/4

FOREIGN PATENT DOCUMENTS

| JP | 11090408 A | * | 4/1999 |
| JP | 2000167512 A | * | 6/2000 |
| JP | 2005074349 A | * | 3/2005 |

* cited by examiner

Primary Examiner—Melvin C Mayes
Assistant Examiner—Melissa Stalder
(74) Attorney, Agent, or Firm—Jeffrey D. Myers; Samantha A. Updegraff; Arpad Kupecz

(57) ABSTRACT

A method for treating bottom ash from a waste incineration plant. The invention relates in particular to a method for treating bottom ash from a domestic waste incineration plant. In accordance with the invention bottom ash having a size ranging up to 2 mm is treated by removing a previously determined component. The treatment comprises at least one of the following steps: the removal of organic components, the removal of heavy metals, the removal of ions and the removal of a fraction having a size of up to 50 μm. It is preferred for the nonferrous heavy metals to be removed and the ferrous metals to remain in the fraction. Most preferably at least one of the treatment steps comprises a wet treatment.

7 Claims, No Drawings

METHOD FOR TREATING BOTTOM ASH

CROSS-REFERENCE TO RELATED APPLICATIONS

This application is a continuation-in-part application of International Patent Cooperation Treaty (PCT) Application Serial No. PCT/NL2006/050189, entitled "A Method for Treating Bottom Ash", to Technische Univesiteit Delft and Gemeente Amsterdam Afval Eergie Bedrijf, filed on Jul. 26, 2006, and the specification and claims thereof are incorporated herein by reference.

This application claims priority to and the benefit of the filing of Netherlands Patent Application Serial No. NL 1029628, entitled "A Method for Treating Bottom Ash", filed on Jul. 27, 2005, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to a method for treating bottom ash from a waste incineration plant, in accordance with the preamble of claim 1.

2. Description of Related Art

The treatment of bottom ash from a waste incineration plant is known in the art. The object of this treatment is to separate the various components of which the bottom ash is comprised. A technique for treating bottom ash is, for example, described in the BAT publications (Best Available Technology, a publication of the European Union specified as Pj/EIPPCB/WI, of March 2004). It is reported that both ferrous and nonferrous metals can be separated from the bottom ash.

It is claimed in said BAT publication that the fine fraction having a size of 0-2 mm cannot be treated but has to be removed. The reason for this being that most of the leachable components are contained in this fine fraction. As a result, the remaining product fraction, having a size larger than 2 mm, leaches out less readily with respect to the total bottom ash stream. The further treatment of this remaining product fraction results in making the treated material suitable for use in a wide area.

BRIEF SUMMARY OF THE INVENTION

The object of the present invention is to provide an improved method for the treatment of bottom ash.

A particular object of the invention is an improved method for the treatment of bottom ash wherein a larger part of the bottom ash produced in a waste incineration plant is treated.

An object of the invention is especially to provide an improved method of the kind mentioned above, wherein the fraction of up to 2 mm can also be treated suitably.

A further object of the invention is to provide the possibility of reusing a larger part of the bottom ash.

A final object of the invention is to reduce the total amount of bottom ash that has to be removed.

DETAILED DESCRIPTION OF THE INVENTION

In order to obtain at least one of the above-mentioned objectives, the invention provides a method as mentioned above, which is characterized by the measures of claim 1.

The treatment may comprise at least one of the following steps:

removal of nonferrous heavy metals, removal of organic components, and removal of particles having a size of 0 to 45 µm.

By carrying out at least one of the above-mentioned treatment steps an improved product is provided that is suitable for reuse.

It is surprising that the treatment of the fraction having a size of up to 2 mm provides such a good, reusable product. The above-mentioned BAT-publications give a representation of the most highly developed methods existing in a particular area of technology. To this end the art is studied extensively in order to provide an overview of the methods that, from a technical as well as economical viewpoint, are developed the furthest.

The fraction having a size of up to 2 mm constitutes approximately 47% by weight of the total amount of bottom ash produced in a waste incineration plant. For this reason a method is preferred that is characterized in that it comprises the step of separating from the bottom ash stream a fraction having a size in the range up to 2 mm, and subsequently treating the separated bottom ash fraction in accordance with claim 1.

According to the prior art, almost half the amount of bottom ash is removed as waste, whereas this can be suitably treated by means of the present method.

According to a further preferred embodiment, the invention is characterized in that at least one of the treatment steps comprises a wet treatment. The advantage with this is that at least some of the leachable components are removed from the fraction to be treated. The wet treatment step may, for example, and preferably, be carried out with the aid of water.

It is further preferred that, after removal of the heavy metals from the fraction, at least a part of the amount of removed ferrous metals be returned to the fraction. Surprisingly, this greatly reduces the leaching out of, in particular, antimony from the fraction. If the fine iron (the ferrous fraction) is removed from the bottom ash to be treated, the leaching of antimony increases by a factor of 3.

According to a further preferred embodiment therefore, the method according to the invention comprises the step of removing only the nonferrous heavy metals and not the ferrous metals.

It has been shown that in particular a combination of the above-mentioned steps that cause the removal of organic materials, nonferrous heavy metals and ions, in combination with the removal of the fraction having a size of 0 to 50 µm and preferably of 0 to 45 µm, results in a product that is usable as a category 1 building material.

The invention therefore comprises preferably a combination of the following steps:
- the removal of nonferrous heavy metals,
- the removal of organic components, —the removal of ions and
- the removal of the fraction having a size from 0-50 μm, preferably from 0 to 45 μm.

The result is a product that complies with the standard for category 1 building materials of the Dutch Building Material Decree (Staatsblad 1995, 567).

The ions that can be removed comprise in particular chlorides. However, it is preferred that other anions such as sulphates, etc. as well a cations be removed to the greatest possible extent from the bottom ash to be treated.

It is especially preferred for the ferrous metals to be removed when the treated bottom ash fraction is used in a bound form, for example, in combination with cement, etc. This is in particular preferable if the treated fraction is used in concrete and calcium silicate brick. The overall quality of the product was shown to improve so that it complied with the standard for a category 1 building material. The imission of substances from this material into the ground is lower than, or equal to, the imission requirements laid down in the Building Material Decree. The reason for this is not known.

The treatment of the bottom ash with a fraction having a size of up to 2 mm occurs preferably in a jig, in particular in a sand jig. Such a device is described in the Dutch patent application NL 1 029 022.

The invention will now be further elucidated by way of an example.

EXAMPLE

The chemical composition of a bottom ash fraction having a size of up to 2 mm was as follows:

TABLE 1

| FEED | |
| --- | --- |
| element | [mg/kg dm] |
| Cl | 394 000 |
| $SO_4$ | 367 000 |
| Sb | 37 |
| Cu | 1 700 |
| Mo | 240 |

This bottom ash was fed to a jig after the fraction having a size of up to 50 μm was removed therefrom.

During the treatment the organic components, heavy metals and ions were removed. This resulted in a product with the following imission values:

TABLE 2

Imission values (according to NEN (Dutch standard) 7343 column test, [mg/m$^2$], 0.2 m height of application) of bottom ash feed, treated product and maximum value for category 1 material according to Building Material Decree

| | Bottom ash feed | Product obtained [mg/m$^2$] | Category 1 (maximum value allowed) [mg/m$^2$] |
| --- | --- | --- | --- |
| Cl | 394 000 | 14 400 | 87 000 |
| $SO_4$ | 367 000 | 110 000 | 300 000 |

TABLE 2-continued

Imission values (according to NEN (Dutch standard) 7343 column test, [mg/m$^2$], 0.2 m height of application) of bottom ash feed, treated product and maximum value for category 1 material according to Building Material Decree

| | Bottom ash feed | Product obtained [mg/m$^2$] | Category 1 (maximum value allowed) [mg/m$^2$] |
| --- | --- | --- | --- |
| Sb | 37 | 98 | 117 |
| Cu | 1700 | 352 | 540 |
| Mo | 240 | 77 | 450 |

Note:
"category 1" is the maximum emission values of category 1 material according to the Building Material Decree.

Thus a product was obtained that complied with the requirements of a category 1 building material. This means that this material may be used without problem as building material, for example, as substitute for sand in cement and/or concrete.

The invention therefore provides a method that is able to turn a hitherto untreatable and unusable fraction of bottom ash produced in a waste incineration plant into a valuable product. In the above example merely 10% of the treated bottom ash was removed as waste. According to the invention therefore, the total amount of bottom ash fraction to be removed as waste is reduced from 47% to only 10%.

The invention is not limited to the steps mentioned above and described in the example. The invention is limited only by the appended claims. A person skilled in the art is quite capable of adapting and altering the above given example so as to create equivalent embodiments. However, these are all encompassed in the present invention and therefore fall within the protective scope of the appended claims.

What is claimed is:

1. A method for treating bottom ash from a waste incineration plant, comprising:
   treating a bottom ash fraction having a size ranging up to 2mm comprising the steps of;
   removing heavy metals whose specific weight is greater than or equal to that of Zn; and
   removing from the bottom ash fraction a sub fraction having a size of up to 50 μm.

2. The method of claim 1 further comprising removing nonferrous heavy metals whose specific weight is greater than or equal to that of Zn.

3. The method of claim 1 further comprising removing organic components.

4. The method of claim 1 further comprising separating from the bottom ash a fraction having a size in the range up to 2mm, and subsequently treating the separated bottom ash fraction in accordance of claim 1.

5. The method of claim 1 further comprising removing from the bottom ash fraction a sub fraction having a size of up to 45 μm.

6. The method of claim 1 further comprising providing a wet treatment.

7. The method of claim 1, wherein after removal of the heavy metals from the fraction, at least a part of the amount of removed ferrous metals is returned to the fraction.

* * * * *